Patented July 29, 1941

2,250,480

UNITED STATES PATENT OFFICE 2,250,480

DIHYDROXY HEXACHLORO DIPHENYL METHANE AND METHOD OF PRODUCING THE SAME

William S. Gump, Nutley, N. J., assignor to Burton T. Bush, Inc., New York, N. Y., a corporation of New Jersey No Drawing. Application March 18, 1939, Serial No. 262,635

6 Claims. (Cl. 260—619)

My invention relates to a new phenol namely, 2,2'- dihydroxy -3,5,6,3',5',6' - hexachlorodiphenyl methane which has the structural formula

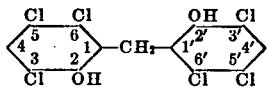

This compound exhibits strong antiseptic and disinfecting action against micro-organisms and particularly against bacteria of the type of Staphylococcus aureus. It is also very effective as a fungicide. As a criterion of its efficacy I can state that the phenol coefficient of the dipotassium salt of this phenol against Staphylococcus aureus is about 185 when tested according to the method of the U. S. Food and Drug Administration, U. S. Department of Agriculture (circular No. 198, Dec. 1931).

This new phenol is a white, practically odorless and tasteless solid compound. These qualities and physical properties permit its wide use as an antiseptic, bactericidal, fungicidal and preserving agent. It may be employed in solid form as well as in solution or emulsion or in admixtures with other active or inert substances such as toothpowders, toothpastes, ointments, creams, cosmetics, rubber goods, etc.

2,2'- dihydroxy-3,5,6,3',5',6'-hexachlorodiphenyl methane is obtained by the reaction of two molecules of 2,4,5-trichlorophenol with one molecule of formaldehyde in the presence of an acid condensing agent. The purified reaction product is a white, crystalline material having a melting point of 161–162° C. It is practically insoluble in water at room temperature, its solubility therein being less than .001%. In organic solvents the solubility of this new phenol is approximately as follows at 20° C.:

| 100 cc. solvent | Dissolve |
|---|---|
| | Grams |
| Ethyl alcohol | 50 |
| Acetone | 191 |
| Benzene | 5.3 |
| Toluene | 5.6 |

In further illustrating my invention I am describing the method followed in the preparation of the phenolic compound.

Example

A mixture prepared from 200 parts 2,4,5-trichlorophenol, 36 parts methanol and 40 parts 35–40% formaldehyde solution is slowly added to 1440 parts sulfuric acid 93% with agitation, keeping the temperature between 0 and 5° C. The addition of the mixture should take about 4 hours and when this point is reached the agitation is continued for approximately 20 hours maintaining the temperature at about 5° C. The finished reaction mixture is quenched on crushed ice and the crude dihydroxy hexachloro diphenyl methane is separated from the acid by filtration followed by washing with water. On drying 200 parts of the crude product are obtained. The tan colored crude material is refined by dissolution in 15% aqueous sodium hydroxide solution employing enough of this solution to form the di-sodium salt of the dihydroxy hexachloro diphenyl methane. The alkaline solution is filtered to remove small amounts of alkali insoluble by-products formed in the reaction and the clear filtrate is acidified using hydrochloric or sulfuric acid in order to reprecipitate the phenolic compound. After washing the precipitate free from acid and drying, the compound is further refined by crystallization from benzene, toluene or ethylene dichloride yielding thus a first crop of 100–110 parts of the pure dihydroxy hexachloro diphenyl methane in the form of white fine needles having a melting point of 161–162° C.

In describing my method of preparing the desired dihydroxy hexachloro diphenyl methane in the above example I am not limiting myself to the exact conditions herein stated as anyone skilled in the art will readily understand that variations in the procedure are possible without materially affecting the result. The methanol used in the example could be replaced by other alcohols like e. g. ethyl alcohol, isopropyl alcohol, the aqueous formaldehyde solution could be replaced by a solution of different strength or by a solid polymer of formaldehyde. The concentration of the sulfuric acid may be lowered and the reaction time and reaction temperature may be changed.

In the practical application of the valuable antiseptic, disinfectant and fungicidal qualities of the 2,2'-dihydroxy-3,5,6,3',5',6'-hexachlorodiphenyl methane many methods can be employed. Solutions can readily be made in alcohol or aqueous alcohol or in a mixture of alcohol, acetone and water or in isopropyl alcohol or aqueous isopropyl alcohol. Such solutions are very valuable as non-irritant skin disinfectants and as fungicidal agents in the treatment of fungus dermatoses as e. g., athlete's foot.

The dihydroxy hexachloro diphenyl methane may also be dissolved in water in the form of its mono- or di-alkali salt by the addition of the calculated amount of alkali metal hydroxide such as the hydroxide of lithium, sodium and potassium. Aqueous solutions of this new phenol also can readily be obtained by addition of alkanolamines such as triethanolamine. This latter type of solution is particularly suited for application in antiseptic mouthwashes, lotions, salves, creams, etc. Phenol coefficient determinations have proven that the germicidal power of the dihydroxy hexachloro diphenyl methane remains practically unchanged when the compound is applied in the form of its water-soluble alkali metal salts or in the form of its addition products with alkanolamines.

The 2,2'-dihydroxy-3,5,6,3',5',6',-hexachlorodiphenyl methane readily yields also other metal salts by double decomposition of a water soluble metal salt with the water soluble alkali salts of this phenol. By this method the magnesium, calcium, barium, zinc, aluminum, copper salts, etc. can be prepared. These salts are very slightly soluble in water but are still highly effective as fungicides, preservatives, antiseptics or insecticides for special applications.

What I claim is:

1. The process of making a dihydroxy hexachloro diphenyl methane characterized by its colorless crystalline appearance and having a melting point of 161°–162° C. comprising the condensation of 2,4,5-trichlorophenol with formaldehyde in the presence of sulfuric acid.

2. The compound, 2,2'-dihydroxy-3,5,6,3',5',6'-hexachloro diphenyl methane, comprising a substantially odorless, tasteless and colorless substance melting at 161 to 162° C.

3. Process of making 2,2'-dihydroxy-3,5,6,3',5',6'-hexachloro diphenyl methane comprising reacting 2 mols of 2,4,5-trichlorophenol with 1 mol of formaldehyde in the presence of sulfuric acid at a temperature of 0–5° C. and purifying the resulting reaction product.

4. Process of making 2,2'-dihydroxy-3,5,6,3',5',6'-hexachloro diphenyl methane comprising reacting a solution containing 2 mols of 2,4,5-trichlorophenol, 1 mol of formaldehyde and an inert organic solvent at a temperature of 0–5° C. in the presence of sulfuric acid and purifying the resulting reaction product.

5. Process of making 2,2'-dihydroxy-3,5,6,3',5',6'-hexachloro diphenyl methane comprising reacting a solution containing 2 mols of 2,4,5-trichlorophenol, 1 mol of formaldehyde and an aliphatic water miscible alcohol at a temperature of 0–5° C. in the presence of sulfuric acid, and purifying the reaction product.

6. Process of making 2,2'-dihydroxy-3,5,6,3',5',6'-hexachloro diphenyl methane comprising reacting a solution containing 2 mols of 2,4,5-trichlorophenol, 1 mol of formaldehyde and methyl alcohol at a temperature of 0–5° C. in the presence of sulfuric acid, and purifying the reaction product.

WILLIAM S. GUMP.